F. W. MANN & M. L. CHAPPELL.
PROCESS FOR REFINING PETROLEUM AND ITS PRODUCTS.
APPLICATION FILED APR. 6, 1915.
1,163,025.
Patented Dec. 7, 1915.
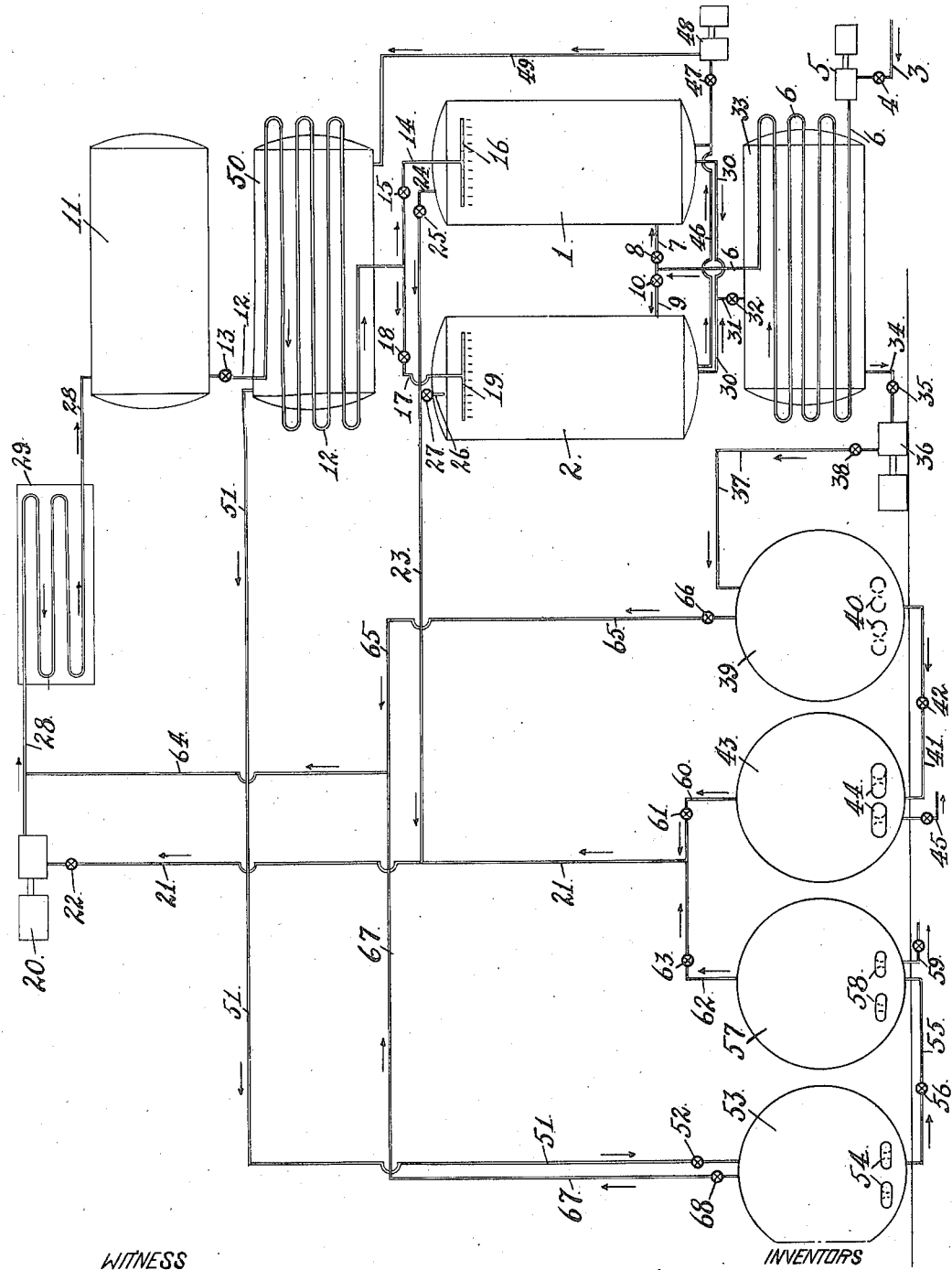
WITNESS
Wm. F. Drew.
INVENTORS
Frederick William Mann
Marvin Lee Chappell
by Wm. F. Booth
ATTORNEY

UNITED STATES PATENT OFFICE.

FREDERICK WILLIAM MANN AND MARVIN LEE CHAPPELL, OF BERKELEY, CALIFORNIA, ASSIGNORS TO STANDARD OIL COMPANY, OF RICHMOND, CALIFORNIA, A CORPORATION OF CALIFORNIA.

PROCESS FOR REFINING PETROLEUM AND ITS PRODUCTS.

1,163,025.   Specification of Letters Patent.   Patented Dec. 7, 1915.

Application filed April 6, 1915. Serial No. 19,454.

*To all whom it may concern:*

Be it known that we, FREDERICK WILLIAM MANN and MARVIN LEE CHAPPELL, citizens of the United States, residing at Berkeley, in the county of Alameda and State of California, have invented certain new and useful Improvements in Processes for Refining Petroleum and Its Products, of which the following is a specification.

This invention relates, in general, to the art of refining crude petroleum, its products and its distillates, and it relates in particular to a novel continuous process of refining such hydrocarbons as are poor in hydrogen and contain a high percentage of sulfur compounds. Such hydrocarbons are, usually, of an asphaltic base, and contain many aromatics and unsaturated bodies, which produce a smoky flame, when their lamp oil fraction is burned in an ordinary kerosene lamp. Furthermore, they contain certain colored bodies, sulfur compounds and unstable bodies, which are objectionable, if present, in the application of such oils for lubricating, transformer, internal use, or for medicinal purposes. Such oils usually require large quantities of sulfuric acid or sulfuric anhydrid for their complete purification, making the process very costly, due to loss from the formation of oxidized products and other chemical actions.

The object of the present invention is to provide a refining process, which avoids loss due to chemical reaction; uses solvents which can be recovered; obtains products of improved qualities; and lowers the cost of refining by the continuous nature of the process.

In its essentials the process may be stated, briefly, to consist in treating the crude petroleum and its products with alcohols, such as methyl, ethyl, propyl and other alcohols, or mixtures of the same, the treatment being at a temperature below 32 degrees Fahr. For certain heavy oils a temperature of 30 degrees Fahr. is required, and for certain lamp oils a temperature from 8 degrees to 15 degrees Fahr. is needed. This low temperature may be had in various ways and by various means. For example, it may be the result of what we may term an external application of the cooling agent to the oil to be treated, such application being made by subjecting the oil to cooling coils in which liquid sulfur dioxid or anhydrous ammonia is expanded, or through which a previously cooled brine solution made of chlorid of calcium or sodium or other solutions are pumped. In such external application, the alcohol, such as methyl, ethyl, propyl or other alcohols, or mixtures of the same are sprayed over the top of the oil and intimately mixed, using one-half to one volume of alcohol or alcohol mixtures for each volume of the oil to be treated. The alcohol or alcohol mixtures dissolve the undesirable bodies and impurities of the oil and the resultant alcohol solution separates from the purified oil, and collects according to the higher or lower specific gravity of the alcoholic solution, either on the bottom, or on the top of the purified oil in the treating tank, and is removed. Afterward the purified oil is finished as usual. But, in practice, we prefer what we may term an internal application of the cooling agent to produce the desired low temperature which is best effected and maintained by the addition to the alcohol of a liquefied gas, such as sulfur dioxid or anhydrous ammonia, and a subsequent volatilization of a part of such liquefied gas. Other cooling agents may be used, but sulfur dioxid is more desirable, because it is easily and cheaply obtained and recovered.

The nature of the process may be more particularly stated as follows. The oil to be treated is charged into a tank; and a mixture of methyl, ethyl, propyl or other alcohols, and liquid sulfur dioxid is added from the top, preferably by being sprayed, using one-half to two volumes of the mixture for each volume of the oil. The mixture of alcohol and liquid sulfur dioxid is made of equal parts. After introducing the mixture, the contents of the tank are agitated, this being best done by means of a vacuum pump, communicating with the top of the tank; the vacuum causing some of the liquefied sulfur dioxid to vaporize, thus producing sufficient agitation, and at the same time lowering the temperature to the desired point. The sulfur dioxid, which is thus vaporized, is condensed and recovered.

When the oil under treatment has had sufficient agitation and the desired temperature is reached, the vacuum pump is stopped and the alcohol mixture settles to the bottom along with the undesirable hydrocarbons, which are held in solution by this mixture. In this way two layers are formed. The bottom layer is drawn off through a heat interchanger where it partially cools down the incoming charge of oil which at this time is being delivered to a second treating tank, a companion of the first tank. From the heat interchanger the bottom layer enters a still in which the alcohol and the remaining sulfur dioxid are distilled off and finally condensed and conducted to a storage tank for use again. The separated oil, consisting of aromatic hydrocarbons, poor in hydrogen, can be used for fuel, or for such other purposes as it may be adapted. The top layer in the treating tank is then drawn off through a heat interchanger, where it partly cools down the alcohol mixture which at the time is on its way into the second treating tank. This top layer oil is run into a still, in which the alcohol and sulfur dioxid are distilled off, condensed and conducted to the storage tank for use again.

In some cases, the refined oil thus obtained is not sufficiently pure for the market, and it is necessary to treat it with a small amount of sulfuric acid. Afterward this oil is washed with water and neutralized with caustic soda, by well known methods.

The process will be more fully understood by reference to the accompanying drawing in which the figure illustrates one form of an apparatus adapted for carrying it out.

1 and 2 are treating tanks.

3 is the oil supply pipe controlled by a valve 4.

5 is a feed pump with which the supply pipe 3 communicates, and 6 is the charging pipe, which leads into the treating tank 1, by a branch 7 controlled by a valve 8, and leads into the charging tank 2, by a branch 9 controlled by a valve 10.

11 is a storage tank for the mixture of alcohol and liquefied sulfur dioxid. From this storage tank leads a delivery pipe 12, controlled by a valve 13, said pipe terminating in a branch 14 controlled by a valve 15, and entering the tank 1, its extremity being fitted with a spraying device 16. From the pipe 12, a similar branch 17 controlled by a valve 18, enters the tank 2 and is fitted with a spraying device 19.

20 is a compressor which on its suction side has a pipe 21, with a controlling valve 22. With this suction pipe 21 is connected a pipe 23, which, by a branch 24, having a valve 25, communicates with the top of the tank 1, and by a branch 26, having a valve 27, communicates with the top of the tank 2. From the pressure side of the compressor 20 leads a pipe 28, which is coiled through a condenser box 29, and then enters the storage tank 11.

From the bottom of the tanks 1 and 2 issues a pipe 30, from which a pipe 31, with a valve 32, leads to a heat interchanger shell 33 in which the charging pipe 6 is coiled. From this heat interchanger shell issues a pipe 34 with a valve 35, said pipe leading to a pump 36, from which a pipe 37 with a valve 38 leads to a still 39 in which is a steam coil 40. From the still 39 leads a pipe 41, having a valve 42, to a second still 43, fitted with a steam coil 44. From the still 43 issues a valve controlled discharge pipe 45.

From the bottom of the tanks 1 and 2 issues a pipe 46 having a valve 47, said pipe leading to a pump 48 from which a pipe 49 extends to and communicates with a heat interchanger shell 50 in which the delivery pipe 12 is coiled. From this shell 50 leads a pipe 51 having a valve 52, said pipe entering a still 53, in which is a steam coil 54. This still is connected by a pipe 55, having a valve 56, with a still 57 in which is a steam coil 58. The still 57 has a valve controlled discharge pipe 59.

The suction pipe 21 of the compressor 20 connects with the still 43 by a branch pipe 60 having a valve 61, and it connects with the still 57 by a branch pipe 62 having a valve 63.

From the pressure pipe 28 of the compressor 20 leads a pipe 64, which connects with the still 39 by a branch pipe 65 having a valve 66, and it connects with the still 53 by a branch pipe 67 having a valve 68.

The courses of the several fluids through the apparatus are indicated by the arrows. The method carried out in this apparatus is, in detail, as follows:—The crude petroleum or its products supplied through pipe 3 are, by means of the pump 5, pipe 6 and branch pipe 7, charged into the treating tank 1. The storage tank 11 is charged with a mixture of alcohol and liquefied sulfur dioxid, in equal parts. This mixture is introduced into the tank 1 through the pipe 12, branch pipe 14 and spraying device 16. Then the compressor 20 is started, which taking suction through pipes 21 and 23 and branch pipe 24, reduces the pressure in the tank 1 and causes a portion of the liquefied sulfur dioxid to vaporize, which lowers the temperature to the desired point and, at the same time, agitates the tank contents thoroughly, so that there is an intimate contact between the oil and the alcohol mixture. The vaporized sulfur dioxid is taken off by the compressor and is passed through the pipe 28 coiled in the condenser 29, through which a constant flow of cold water is maintained. In this coil under sufficient pressure it becomes liquefied and flows into the storage tank 11. The heat of compression is neutralized by the cold water in the condenser. When the treated oil in the tank 1 has had sufficient agitation and has reached the desired temperature, the compressor 20 is stopped and the valve 25 at the branch 24 into the tank is closed. The mixture in the said tank separates into two layers. The bottom layer, consisting of aromatic oils and oils poor in hydrogen held in solution by the alcohol mixture, is drawn off through the pipes 30 and 31, into the heat exchange shell 33, and at the same time the other treating tank 2 is charged by the pump 5 with fresh oil for the next treatment. Thus in the charging pipe 6 and the shell 33 there is an exchange of heat between the incoming oil and the outgoing alcohol mixture. This latter after said heat interchange, is delivered by the pipe 34 to the pump 36, by which it is forced through the pipe 37 into the still 39. In this still, by means of the steam coil 40 the temperature is raised sufficiently to vaporize nearly all the alcohol and remaining liquid sulfur dioxid. The vaporized alcohol and sulfur dioxid pass from the still 39, through the pipes 65 and 64 into the compressor pipe 28, in the condensing coil of which they are under sufficient pressure to be liquefied, and as liquids they then run into the storage tank 11.

In order to separate more completely the bottom layer oil from the sulfur dioxid and alcohol, it is drawn from the still 39, through the pipe 41 into the still 43, which is heated by the steam coil 44 and is kept under a partial vacuum produced through the compressor suction pipe 21 and the branch pipe 60.

The top layer or refined oil in the tank 1, is next taken off through pipe 46 and by means of the pump 48 is passed through the pipe 49 into the heat exchanger shell 50, in which it partly cools down the alcohol mixture which is at the same time passing through the coil pipe 12 on its way to the second treating tank 2 to be delivered therein through the spraying device 19. From the exchanger shell 50, the top layer oil overflows through pipe 51 into the still 53, wherein, under the heat from the steam coil 54, most of the alcohol and remaining sulfur dioxid is distilled off, and their vapors passing through pipes 67 and 64 enter pipe 28 and are condensed in the coil of said pipe in the water box 29, and thence as liquids they run into the storage tank 11. In order to free more completely this top layer oil from the sulfur dioxid and alcohol, it is drawn from the still 53, through the pipe 55 into the still 57, which is heated by the steam coil 58 and is kept under partial vacuum through the pipes 62 and 21. From the still 57 the oil runs to a storage tank through the pipe 59, while the contents of the still 43 pass to their destination through the pipe 49.

If necessary the oil is treated finally with a small amount of sulfuric acid, washed and neutralized by the well known methods.

We claim:—

1. The process of refining petroleum and its products, which consists in treating such oils with alcohol, at a temperature below 32 degrees Fahr., and in quantity sufficient to dissolve such constituents as need to be removed; and then separating the two resultant liquids.

2. The process of refining petroleum and its products, which consists in treating such oils with alcohol, at a temperature below 32 degrees Fahr., in the presence of a liquefied gas, and in quantity sufficient to dissolve such constituents as need to be removed; and then separating the two resultant liquids.

3. The process of refining petroleum and its products, which consists in treating such oils with alcohol, at a temperature below 32 degrees Fahr. in the presence of liquid sulfur dioxid, and in quantity sufficient to dissolve such constituents as need to be removed; and then separating the two resultant liquids.

4. The process of refining petroleum and its products, which consists in treating such oils with alcohol at a temperature below 32 degrees Fahr., in the presence of a liquefied gas, which is used to obtain the desired low temperature, and in quantity sufficient to dissolve such constituents as need to be removed; and then separating the two resultant liquids.

5. The process of refining petroleum and its products, which consists in treating such oils with alcohol, at a temperature below 32 degrees Fahr., in the presence of liquid sulfur dioxid, which is used to obtain the desired low temperature, and in quantity sufficient to dissolve such constituents as need to be removed; and then separating the two resultant liquids.

6. The process of refining petroleum and its products, which consists in treating such oils with alcohol, at a temperature below 32 degrees Fahr., in the presence of a liquefied gas, which is used to obtain the desired low temperature, and in quantity sufficient to dissolve such constituents as need to be removed; then separating the two resultant liquids; and finally separating the alcohol and liquefied gas both from the refined petroleum or its products, and from the dissolved and removed constituents.

7. The process of refining petroleum and its products, which consists in treating such oils with alcohol, at a temperature below 32 degrees Fahr., and in the presence of liquefied sulfur dioxid, which is used to obtain the desired low temperature, and in quantity sufficient to dissolve such constituents as need to be removed; then separating the two resultant liquids; and, finally separating the alcohol and liquefied sulfur dioxid both from the refined petroleum or its products, and from the dissolved and removed constituents.

8. The process of refining petroleum and its products, which consists in separately treating such oils in successive charges, with alcohol at a temperature below 32 degrees Fahr. in the presence of a liquefied gas, which is used to obtain the desired low temperature, and in quantity sufficient to dissolve such constituents as need to be removed; then separating the two resultant liquids, and, in said separation, exchanging the heat of the liquids of one charge with the incoming oil and the alcohol and liquefied gas of the succeeding charge; and, finally separating the alcohol and liquefied gas both from the refined petroleum or its products and from the dissolved and removed constituents.

In testimony whereof we have signed our names to this specification in the presence of two subscribing witnesses.

FREDERICK WILLIAM MANN.
MARVIN LEE CHAPPELL.

Witnesses:
 WM. F. BOOTH,
 D. B. RICHARDS.